2,819,235

VINYL-COMPATIBLE RESINS BASED ON 2,4-DIMETHYL-4-HYDROXYETHOXYMETHYL-1,5-PENTANEDIOL

Carl K. Fink, Pittsburgh, and Kenneth L. Brown, Library, Pa., assignors to Union Carbide Corporation, a corporation of New York No Drawing. Application September 1, 1953
Serial No. 377,968

14 Claims. (Cl. 260—22)

The vinyl chloride resins derived from the polymerization of vinyl chloride with itself or with other monomers, such as vinyl acetate or vinylidene chloride, are widely employed as coatings, particularly in applications where a high degree of resistance to water, acids, chemicals and other corrosive environments is desired. It would be desirable to have alkyd resins which could be used with such resins to increase the flexibility, gloss, adhesion, and nonvolatile content at spraying viscosity as typical alkyd resins are employed by the coatings industry in conventional nitrocellulose finishes. However, this has been possible, heretofore, only to a small extent, because the typical alkyd resins have only limited compatibility with the vinyl resins.

Accordingly, the object of this invention is to provide a new type of alkyd resin which is compatible with vinyl resins, and which can be used in admixture with these resins. We have found that such alkyd resins may be made by replacing the conventional type of polyhydric alcohol employed in making alkyd resins, such as glycerol or pentaerythritol, with a new and distinctive type of triol. This triol is 2,4-dimethyl-4-hydroxyethoxymethyl-1,5-pentanediol, hereafter referred to as "triol A." This triol may be made from ethylene glycol and methacrolein by the general method given for making substituted pentanediol in U. S. Patent No. 2,600,275.

The alkyd resins from triol A which are suitable for use in admixture with vinyl resins are formed by esterifying the triol with a mixture of dicarboxylic acids or anhydrides and higher fatty acids to form complex polyesters. The polyesters are desirably of a low acid number varying from 2 to 20. Such polyesters are obtained by charging the ingredients in such proportions that there is a slight excess of hydroxyl groups to total carboxyl groups. Also, the alkyd resins of the invention may vary from the short oil type to the long oil type corresponding to a molar ratio of dibasic acid to higher fatty acid from 5.1 to 1 to 0.8 to 1. Suitable dicarboxylic acids or anhydrides include phthalic anhydride, tetrahydrophthalic anhydride, maleic anhydride, succinic anhydride, adipic acid, glutaric acid, pimelic acid, sebacic acid, terephthalic acid, 1,4-endomethylenetetrahydrophthalic acid, and similar acids of this class. As fatty acids, there may be used any of the higher fatty acids, such as those containing from eight to twenty-two carbon atoms and including any of the fatty acids derived from drying, semi-drying or non-drying natural occurring oils. Examples of such acids include 2-ethylhexoic acids, caproic, caprylic, capric, myristic, palmitic, stearic, lauric acid, oleic acid, linoleic acid, linolenic acid, ricinoleic acid, elaeostearic, abietic acid and the like. Usually the fatty acids are employed in the form of the mixtures commercially available such as soya oil fatty acids, cottonseed oil fatty acids, tung oil fatty acids and the like.

Solutions of these alkyd resins from triol A in aromatic hydrocarbons may be mixed with solutions of vinyl chloride resins in ketone solvents to form lacquers from which strong and durable films are deposited on air-drying or baking. These alkyd resins improve the flow characteristics and increase the solids content of the lacquers at sprayable viscosities. After being coated on a surface, the alkyd resins improve the gloss and adhesion of the coating. These alkyd resins from triol A may also be incorporated in organosols which are dispersions of vinyl chloride resins in dispersant-thinner mixtures of ketones and hydrocarbons in balanced proportions as described in U. S. Patent No. 2,431,078.

The alkyd resins from triol A described in the examples to follow were tested for compatibility with the vinyl chloride resins commonly used in coatings. These resins were as follows:

| Vinyl Chloride Resins | Intrinsic Viscosity, 0.2% in Cyclohexanone at 20° C. |
|---|---|
| Polyvinyl chloride | 1.2 |
| Copolymer of vinyl chloride, 87%, and vinyl acetate, 13% | 0.53 |
| Copolymer of vinyl chloride, 95%, and vinyl acetate, 5% | 1.25 |
| Copolymer of vinyl chloride, 94%, and vinylidene chloride, 6% | 0.85 |

The alkyd resins were considered compatible with the vinyl resins when the films of the mixed resins having a dry film thickness of 5 mils or more exhibited no haze upon examination with a Tyndall beam. Before examination, all the films were air-dried and baked for one-half hour at 250° F. to obtain essentially solvent free films. All the vinyl chloride resins listed above were tested for compatibility in this manner and the following results obtained:

TABLE I

Compatibility of alkyd resins with vinyl resins

| Alkyd Resins | Alkyd to Vinyl Resin Ratio | | |
|---|---|---|---|
| | 4:1 | 1:1 | 1:4 |
| Example I | C | C | C |
| Example II | C | C | C |
| Example III | C | C | C |
| Example IV | C | C | C |
| Example V | C | C | C |
| Example VI | C | C | C |
| Example VII | C | C | C |
| Example VIII | I | C | C |

C = Compatible.
I = Incompatible.

The alkyd resins from triol A were prepared as described in the examples to follow:

EXAMPLE I

| Resin Components | Grams | Mole Ratio |
|---|---|---|
| Soya Oil Fatty Acids | 168 | 0.5 |
| Phthalic Anhydride | 195.4 | 1.1 |
| Triol A | 278.3 | 1.0 |
| Xylene | 40 | |

The foregoing ingredients were charged simultaneously into a vessel equipped for agitation, and having a nitrogen inlet, a water decanter and a condenser. The charge was heated under an atmosphere of nitrogen to reflux and the xylene content was adjusted to give a moderate reflux in order to maintain a pot temperature of 220° to 225° C. After 12 hours at this temperature the batch was thinned with xylene to 80 percent solids and had a body of W (on the Gardner-Holdt scale), a color of 9–10 (on the Hellige scale) and an acid number of 15. (The Gardner-Holdt viscosity and Hellige Color values are well known industrial tests. In these tests, the higher letters and higher numbers represent, respectively, higher viscosity and darker color.)

Similar resins prepared by replacing triol A on a molar basis with glycerol, trimethylolpropane and 1,2,6-hexanetriol were incompatible with the aforementioned vinyl resins.

EXAMPLE II

| Resin Components | Grams | Mole Ratio |
|---|---|---|
| Soya Oil Fatty Acids | 84 | 0.35 |
| Phthalic Anhydride | 142.1 | 1.1 |
| Triol A | 195.7 | 1.0 |
| Xylene | 40 | |

The materials were charged simultaneously into the reaction kettle equipped as in Example I. The charge was brought to reflux and held for 2 hours at 220° C. and 9 hours at 240° C. After this period of time the batch was thinned with xylene to 70 percent solids and had a body of T (on the Gardner-Holdt scale), a color of 10 (on the Hellige scale) and an acid number of 12.

Similar resins prepared by replacing triol A on a molar basis with glycerol, trimethylolpropane and 1,2,6-hexanetriol were incompatible with the aforementioned vinyl resins.

EXAMPLE III

| Resin Components | Grams | Mole Ratio |
|---|---|---|
| Soya Oil Fatty Acids | 56 | 0.23 |
| Phthalic Anhydride | 154 | 1.2 |
| Triol A | 201 | 1.0 |
| Xylene | 40 | |

The materials were charged simultaneously into the reaction kettle equipped as before. The charge was brought to reflux and held for 2 hours at 220° C. and 9 hours at 240° C. After this period of time the batch was thinned with xylene to 69 percent solids and had a body of U (on the Gardner-Holdt scale), a color of 8-9 (on the Hellige scale) and an acid number of 16.

EXAMPLE IV

| Resin Components | Grams | Mole Ratio |
|---|---|---|
| Soya Oil Fatty Acids | 168 | 0.51 |
| Phthalic Anhydride | 159.8 | 0.91 |
| Maleic Anhydride | 23.5 | 0.2 |
| Triol A | 273.2 | 1.0 |
| Xylol | 40 | |

The materials were charged simultaneously into the reaction kettle equipped as before. The mass was brought to reflux and the xylene content adjusted to maintain a pot temperature of 200° C. The temperature was raised to 220° C. over a one-half hour period and held at this temperature for 4 hours. At this time the batch was thinned with xylene to 50 percent solids and had a body of V (on the Gardner-Holdt scale), a color of 6 (on the Hellige scale) and an acid number of 18.

Similar resins prepared by replacing triol A on a molar basis with glycerol, trimethylolpropane and 1,2,6-hexanetriol were incompatible with the aforementioned vinyl resins.

EXAMPLE V

| Resin Components | Grams | Mole Ratio |
|---|---|---|
| Soya Oil Fatty Acids | 229 | 1.1 |
| Phthalic Anhydride | 97 | 0.87 |
| Triol A | 174 | 1.0 |
| Xylene | 40 | |

The materials were charged simultaneously into the reaction kettle equipped as before. The charge was brought to reflux and the xylene content adjusted to maintain a pot temperature of 220 to 225° C. After reacting at this temperature for 11 hours the solvent was blown out by vigorously purging with inert gas to yield a product of 99 to 100 percent solids with a body of Y-Z (on the Gardner-Holdt scale), a color of 11 (on the Hellige scale) and an acid number of 12.

Similar resins prepared by replacing triol A with glycerol, trimethylolpropane, and 1,2,6-hexanetriol were incompatible with the aforementioned vinyl resins.

EXAMPLE VI

| Resin Components | Grams | Mole Ratio |
|---|---|---|
| Lauric Acid, Commercial | 129 | 0.40 |
| Cottonseed oil Fatty Acids | 30 | 0.07 |
| Phthalic Anhydride | 193 | 0.88 |
| Maleic Anhydride | 3 | 0.23 |
| Triol A | 334 | 1.0 |
| Xylene | 40 | |

The foregoing ingredients were charged simultaneously into the reaction kettle equipped as before. The mass was brought to reflux and the xylene content adjusted to maintain a pot temperature of 210-215° C. After 13 hours at this temperature, the batch was thinned with toluene to 80 percent solids. The resin had a body of U (on the Gardner-Holdt scale), a color of 11 (on the Hellige scale) and an acid number of 7.

Similar resins prepared by replacing triol A on a molar basis with glycerol, trimethylolpropane and 1,2,6-hexanetriol were incompatible with the aforementioned vinyl resins.

EXAMPLE VII

| Resin Components | Grams | Mole Ratio |
|---|---|---|
| 2-Ethylhexoic Acid | 151.2 | 0.48 |
| Phthalic Anhydride | 290 | 0.88 |
| Maleic Anhydride | 5 | 0.23 |
| Triol A | 506 | 1.0 |
| Xylene | 40 | |

The foregoing reactants were charged simultaneously into the reaction kettle equipped as before. The mass was brought to reflux and the xylene content adjusted to maintain a pot temperature of 210-215° C. After 4 hours at this temperature the pot temperature was raised to 220-225° C. by removing xylene and held at this temperature for 8½ hours. At this time, the batch was thinned with toluene to 75 percent solids. After thinning, the resin had a body of U-V (on the Gardner-Holdt scale), a color of 10 (on the Hellige scale) and an acid number of 11.

Similar resins prepared by replacing triol A on a molar basis with glycerol, trimethylolpropane and 1,2,6- hexanetriol were incompatible with the aforementioned vinyl resins.

EXAMPLE VIII

| Resin Components | Grams | Mole Ratio |
|---|---|---|
| W. W. Wood Rosin | 600 | [1] 1.54 |
| Maleic Anhydride | 89 | 0.7 |
| Triol A | 296 | 1.0 |

[1] Calculated as abietic acid.

The wood rosin was charged into a vessel equipped for agitation and having an inlet for admitting nitrogen and melted at a temperature of 150° C. The maleic anhydride was added at this temperature and the temperature of the mass was raised to 200° C. over a period of one-half hour. At this temperature, the triol A was added and the temperature raised to 250-260° C. After 9 hours at this temperature, the resulting resin was poured into a flat pan and cooled. The resin was a brittle, clear-brown material having a softening point of 81° C. (Ball and Ring method), an acid number of 48, and a color of 10–11 (on the Hellige scale), and a viscosity of D (on the Gardner-Holdt scale) at 60 percent solids in toluene.

Similar resins prepared by replacing triol A on a molar basis with glycerol and 1,2,6-hexanetriol were incompatible with the aforementioned vinyl resins.

We claim:

1. A resinous polyester of 2,4-dimethyl-4-hydroxyethoxymethyl-1,5-pentanediol with at least one dicarboxylic acid and at least one monocarboxylic acid containing at least eight carbon atoms, the molar ratio of said dicarboxylic acid to said monocarboxylic acid in the resinous polyester being between 5.1 to 1 and 0.8 to 1.

2. A resinous polyester of 2,4-dimethyl-4-hydroxyethoxymethyl-1,5-pentanediol with phthalic acid and soya oil fatty acids, the molar ratio of the phthalic acid to the soya oil fatty acids in the resinous polyester being between 5.1 to 1 and 0.8 to 1.

3. A resinous polyester of 2,4-dimethyl-4-hydroxyethoxymethyl-1,5-pentanediol with phthalic acid, maleic acid and soya oil fatty acids, the molar ratio of the phthalic acid and maleic acid to the soya oil fatty acids in the resinous polyester being between 5.1 to 1 and 0.8 to 1.

4. A resinous polyester of 2,4-dimethyl-4-hydroxyethoxymethyl-1,5-pentanediol with phthalic acid, maleic acid, cottonseed oil fatty acids and lauric acid, the molar ratio of the phthalic acid and maleic acid to the cottonseed oil fatty acids and lauric acid in the resinous polyester being between 5.1 to 1 and 0.8 to 1.

5. A resinous polyester of 2,4-dimethyl-4-hydroxyethoxymethyl-1,5-pentanediol with phthalic acid, maleic acid and 2-ethylhexoic acid, the molar ratio of the phthalic acid and maleic acid to the 2-ethylhexoic acid in the resinous polyester being between 5.1 to 1 and 0.8 to 1.

6. A resinous polyester of 2,4-dimethyl-4-hydroxyethoxymethyl-1,5-pentanediol with maleic acid and abietic acid, the molar ratio of the maleic acid to the abietic acid in the resinous polyester being between 5.1 to 1 and 0.8 to 1.

7. A composition comprising a vinyl chloride resin selected from the group consisting of polyvinyl chloride, copolymers of vinyl chloride and vinyl acetate, and copolymers of vinyl chloride with vinylidene chloride and a resinous polyester of 2,4-dimethyl-4-hydroxyethoxymethyl-1,5-pentanediol with at least one dicarboxylic acid and at least one monocarboxylic acid containing at least eight carbon atoms, the molar ratio of the dicarboxylic acid to the monocarboxylic acid in the resinous polyester being between 5.1 to 1 and 0.8 to 1 and the ratio of the said polyester resin to the vinyl chloride resin being between 4 to 1 and 1 to 4.

8. A composition comprising a vinyl chloride resin selected from the group consisting of polyvinyl chloride, copolymers of vinyl chloride and vinyl acetate, and copolymers of vinyl chloride with vinylidene chloride and a resinous polyester of 2,4-dimethyl-4-hydroxyethoxymethyl-1,5-pentanediol with phthalic acid and soya oil fatty acids, the molar ratio of the phthalic acid to the soya oil fatty acids in the resinous polyester being between 5.1 to 1 and 0.8 to 1 and the ratio of the resinous polyester to the vinyl chloride resin being between 4 to 1 and 1 to 4.

9. A composition comprising a vinyl chloride resin selected from the group consisting of polyvinyl chloride, copolymers of vinyl chloride and vinyl acetate, and copolymers of vinyl chloride with vinylidene chloride and a resinous polyester of 2,4-dimethyl-4-hydroxyethoxymethyl-1,5-pentanediol with phthalic acid, maleic acid and soya oil fatty acids, the molar ratio of the phthalic acid and maleic acid to the soya oil fatty acids in the resinous polyester being between 5.1 to 1 and 0.8 to 1 and the ratio of the resinous polyester to the vinyl chloride resin being between 4 to 1 and 1 to 4.

10. A composition comprising a vinyl chloride resin selected from the group consisting of polyvinyl chloride, copolymers of vinyl chloride and vinyl acetate, and copolymers of vinyl chloride with vinylidene chloride and a resinous polyester of 2,4-dimethyl-4-hydroxyethoxymethyl-1,5-pentanediol with phthalic acid, maleic acid, cottonseed oil fatty acids, and lauric acid, the molar ratio of the phthalic acid and maleic acid to the cottonseed oil fatty acids and lauric acid in the resinous polyester being between 5.1 to 1 and 0.8 to 1 and the ratio of the resinous polyester to the vinyl chloride resin being between 4 to 1 and 1 to 4.

11. A composition comprising a vinyl chloride resin selected from the group consisting of polyvinyl chloride, copolymers of vinyl chloride and vinyl acetate, and copolymers of vinyl chloride with vinylidene chloride and a resinous polyester of 2,4-dimethyl-4-hydroxyethoxymethyl-1,5-pentanediol with phthalic acid, maleic acid, and 2-ethyl-hexoic acid, the molar ratio of the phthalic and maleic acid to the 2-ethyl-hexoic acid in the resinous polyester being between 5.1 to 1 and 0.8 to 1 and the ratio of the resinous polyester to the vinyl chloride resin being between 4 to 1 and 1 to 4.

12. A composition comprising a vinyl chloride resin selected from the group consisting of polyvinyl chloride, copolymers of vinyl chloride and vinyl acetate, and copolymers of vinyl chloride with vinylidene chloride and a resinous polyester of 2,4-dimethyl-4-hydroxyethoxymethyl-1,5-pentanediol with maleic acid and abietic acid, the molar ratio of the maleic acid to the abietic acid in said polyester being between 5.1 to 1 and 0.8 to 1 and the ratio of the said resinous polyester to the vinyl chloride resin being between 4 to 1 and 1 to 4.

13. A resinous polyester of 2,4-dimethyl-4-hydroxyethoxymethyl-1,5-pentanediol with at least one dicarboxylic acid and at least one higher fatty acid containing at least eight carbon atoms, the molar ratio of said dicarboxylic acid to said fatty acid in said polyester being between 5.1 to 1 and 0.8 to 1.

14. A composition comprising a vinyl resin of the group consisting of polyvinyl chloride, copolymers of vinyl chloride and vinyl acetate, and copolymers of vinyl chloride with vinylidine chloride plasticized with a resinous polyester of 2,4-dimethyl-4-hydroxyethoxymethyl-1,5-pentanediol with at least one dicarboxylic acid and at least one higher fatty acid containing at least eight carbon atoms, the molar ratio of said dicarboxylic acid to said fatty acid in said polyester being between 5.1 to 1 and 0.8 to 1 and the ratio of the said resinous polyester to the vinyl chloride resin being between 4 to 1 and 1 to 4.

References Cited in the file of this patent

UNITED STATES PATENTS 2,600,275    Smith _____ June 10, 1952
2,671,063    Waldie _____ Mar. 2, 1954

OTHER REFERENCES

Kienle et al. Ind. & Eng. Chem. April 1929, p. 349.
Ellis, Chem. of Synthetic Resins, 1935, Vol. 2, p. 862 (copy in Scientific Lib.).